No. 751,669.

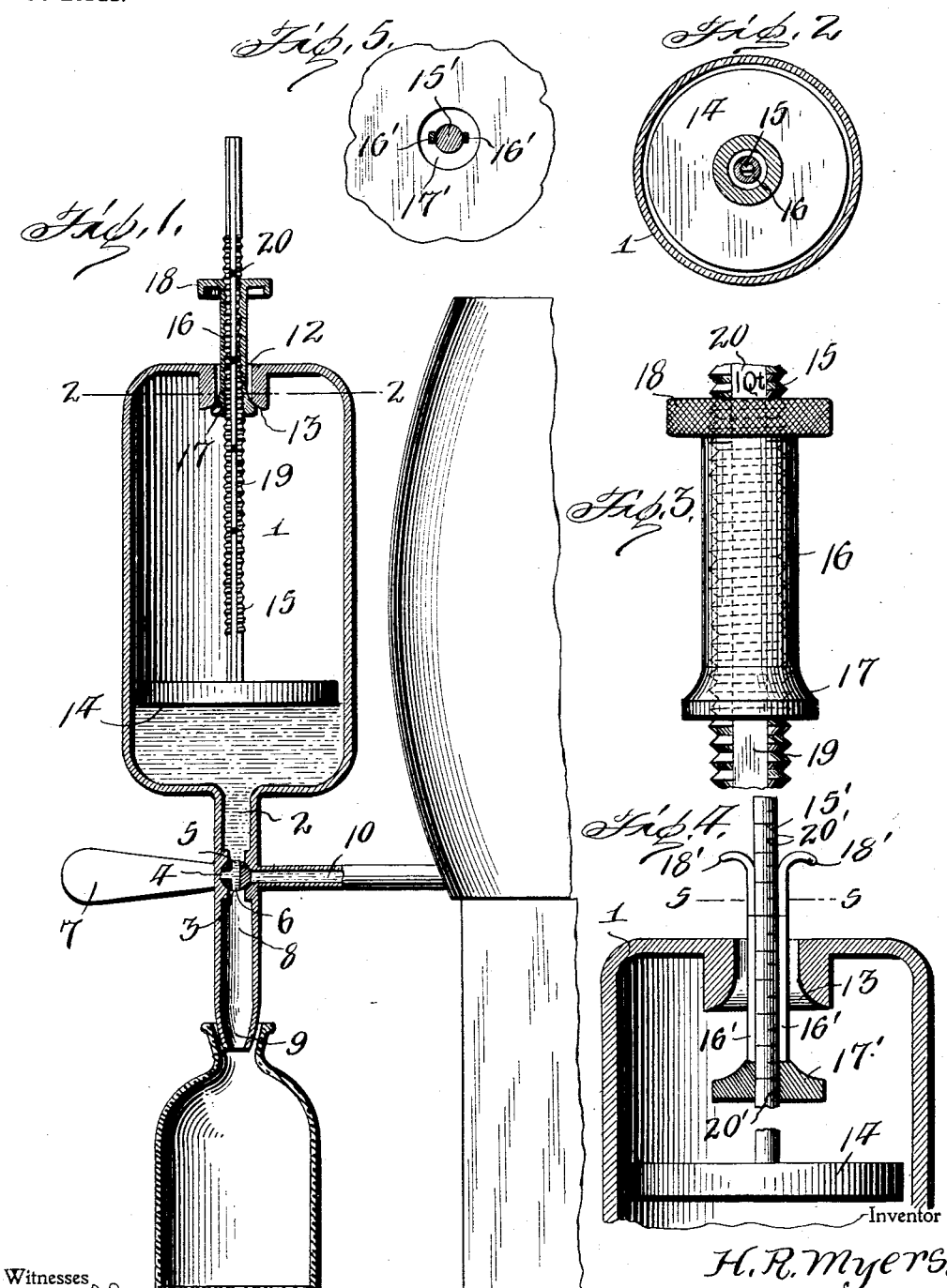

Patented February 9, 1904.

UNITED STATES PATENT OFFICE.

HENRY R. MYERS, OF COVINGTON, KENTUCKY.

AUTOMATIC MEASURE AND FUNNEL.

SPECIFICATION forming part of Letters Patent No. 751,669, dated February 9, 1904.

Application filed October 12, 1903. Serial No. 176,706. (No model.)

*To all whom it may concern:*

Be it known that I, HENRY R. MYERS, a citizen of the United States, residing at Covington, in the county of Kenton and State of Kentucky, have invented certain new and useful Improvements in Automatic Measures and Funnels; and I do declare the following to be full, clear, and exact description of the invention, such as will enable others skilled in the art to which it appertains to make and use the same.

My invention relates to improvements in measuring devices, and more particularly to a faucet adapted to measure a predetermined quantity of liquid.

The object of my invention is to provide a device of this character which will be simple in construction, durable in use, efficient in operation, and comparatively inexpensive to manufacture.

With this and other objects in view the invention consists of certain novel features of construction, combination, and arrangement of parts, as will be more fully described, and particularly pointed out in the appended claims.

In the accompanying drawings, Figure 1 is a vertical sectional view of my improved device. Fig. 2 is a detail horizontal sectional view of the same, taken on the line 2 2 of Fig. 1. Fig. 3 is a detail view of the valve-stem and its adjustable valve. Fig. 4 is a detail view of a modified form of my invention. Fig. 5 is a detail sectional view through the same, taken on the line 5 5 of Fig. 4.

In the embodiment of my invention as illustrated in Figs. 1 to 3 of the drawings the numeral 1 denotes a measuring vessel or chamber having at its lower end an inlet and outlet opening 2, in which a three-way valve 3 is mounted. The valve is in the form of a rotary plug or cock having three ways, as at 4, 5, and 6, and having its outer end provided with an operating-handle 7.

8 denotes a discharge-opening leading from the valve-casing and terminating in a discharge-nozzle 9, and 10 denotes a supply-pipe or connection leading from a cask 11 or from any suitable source of supply to the casing of the valve, as shown.

In the center of the upper end of the measuring vessel 1 is formed an air vent or opening 12, having at its inner and lower end a valve-seat 13.

14 denotes a float disposed in said measuring vessel and carrying a vertically-projecting screw-threaded stem 15, upon which an internally-screw-threaded sleeve 16 is adjustably mounted. Said sleeve and stem project through the air-vent 12 and slide freely therein. At the lower and inner end of the sleeve 16 is formed a valve 17, adapted to coact with the valve-seat 13 to control the air-vent 12, and at its upper and outer end is a milled head or handpiece 18, by means of which the sleeve may be readily turned upon the stem to adjust the position of the valve 17.

In order to indicate the position of the valve upon the stem of the float, said stem has a portion of its screw-threads cut away along one side to provide a smooth surface 19, upon which a measuring-scale 20 is marked. The stem is thus graduated in any desired measure, so that the marks 20 will show above the top of the sleeve 16 to indicate the quantity of liquid which will be permitted to enter the measuring vessel 1.

The operation of the device is as follows: By screwing the sleeve 16 in the proper direction the valve 17 will be adjusted upon the stem 15 so that it will close the air-vent 12 when the desired quantity of liquid has entered the measuring vessel and elevated the float 14. The predetermined quantity of liquid which will be permitted to enter the vessel is indicated by the mark 20 upon the stem, which appears directly above the top of the sleeve 16. The handle 7 of the three-way cock 3 is then turned to cause the ways 4 and 5 to communicate, respectively, with the opening 2 of the measuring vessel and the supply-pipe 10, and thus permit the liquid from the source of supply to flow into the measuring vessel and elevate the float 14. When the predetermined quantity of liquid has entered the said vessel, the air-vent 12 is closed by the valve 17 engaging its seat 13, and any further inlet of liquid is thereby prevented. The handle 7 is then turned to cut off the supply-pipe 10 and to permit the ways 5 and 3 of the valve to communicate, respectively, with the opening 2 of the vessel and the discharge-nozzle 9, as shown in Fig. 1. The liquid in the measuring vessel is thus permitted to discharge into a bottle, jug, or other container 21, placed below the nozzle 9.

In the embodiment of my invention as illustrated in Figs. 4 and 5 the float and valve-stem 15' is a cylindrical rod and is not screw-threaded. The valve 17' is slidably mounted upon the same and is held in any adjusted position by frictional contact with the stem. In order to move the valve, one or more rods 16' are attached to the same and extend parallel with the stem, bearing against the same. Said rods 16' have finger-pieces or hooks 18' at their upper and outer ends, by means of which they are moved. The stem 15' is also graduated, as at 20', with a suitable measuring-scale. The operation of this form of the invention is the same as that previously described.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

1. In a device of the character described, the combination of a measuring vessel having an inlet and outlet opening in its lower end and an air-vent in its upper end provided with a valve-seat, a float in said vessel, a screw-threaded stem carried by said float and projecting through said air-vent, an internally-screw-threaded sleeve upon said stem and extending through said air-vent, a valve formed at the lower end of said sleeve and adapted to coact with said valve-seat, and an operating-head formed upon the upper end of said sleeve, substantially as described.

2. In a device of the character described, the combination with a three-way valve and a casing therefor, of a supply-pipe leading to said valve-casing, a discharge-pipe leading from said valve-casing, a measuring vessel attached to said valve-casing and having an air-vent in its upper end formed with a valve-seat, a float in said vessel, a screw-threaded stem carried by said float and projecting through said air-vent, scale-graduations upon said stem, a sleeve adjustable upon the screw-threads of said stem and coacting with said scale-graduations, and a valve formed upon said sleeve and adapted to coact with said valve-seat, substantially as described.

In testimony whereof I have hereunto set my hand in presence of two subscribing witnesses.

HENRY R. MYERS.

Witnesses:
CATHERINE M. MALEY,
E. WM. OESPER, Jr.